US010369724B2

(12) United States Patent
Ortega Andrade et al.

(10) Patent No.: US 10,369,724 B2
(45) Date of Patent: Aug. 6, 2019

(54) METHOD OF MAKING SPHEROIDAL PARTICLES

(71) Applicant: Schlumberger Technology Corporation, Sugar Land, TX (US)

(72) Inventors: Jose Alberto Ortega Andrade, Houston, TX (US); Jiangshui Huang, Sugar Land, TX (US); Bernhard Rudolf Lungwitz, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 61 days.

(21) Appl. No.: 14/946,026

(22) Filed: Nov. 19, 2015

(65) Prior Publication Data

US 2017/0144330 A1 May 25, 2017

(51) Int. Cl.
*B01J 2/08* (2006.01)
*B01J 2/18* (2006.01)
*B29B 9/16* (2006.01)
*B29L 31/00* (2006.01)
*E21B 43/267* (2006.01)

(52) U.S. Cl.
CPC ........... *B29B 9/16* (2013.01); *B01J 2/08* (2013.01); *B01J 2/18* (2013.01); *E21B 43/267* (2013.01); *B29L 2031/7734* (2013.01)

(58) Field of Classification Search
None
See application file for complete search history.

(56) References Cited

U.S. PATENT DOCUMENTS

| | | | | |
|---|---|---|---|---|
| 3,993,578 A | * | 11/1976 | Gerontopoulos | B01J 2/08 252/634 |
| 4,060,497 A | | 11/1977 | Huschka et al. | |
| 4,063,856 A | * | 12/1977 | Dziedzic | B01J 2/08 425/5 |
| 4,179,408 A | * | 12/1979 | Sanchez | B01J 21/04 423/628 |
| 4,182,627 A | * | 1/1980 | Hardwick | B01J 2/08 401/215 |
| 5,500,162 A | | 3/1996 | Theisen et al. | |
| 6,197,073 B1 | | 3/2001 | Kadner et al. | |

(Continued)

FOREIGN PATENT DOCUMENTS

WO 2011044612 A1 4/2011
WO 2015077130 A1 5/2015

OTHER PUBLICATIONS

International Search Report and Written Opinion issued in International Patent Application No. PCT/US2016/062119 dated Feb. 28, 2017; 12 pages.

(Continued)

*Primary Examiner* — Mary Lynn F Theisen
(74) *Attorney, Agent, or Firm* — Andrea E. Tran

(57) ABSTRACT

A method for forming spheroidal particles including inducing flow of a slurry of particles and a reactant through one or more orifices, detaching an amount of the slurry from the slurry flow following exit from the one or more orifices, the detached amount forming a slurry body, forming the slurry body into a spheroidal shape, contacting the spheroidally shaped slurry body with a coagulation solution to form a stabilized spheroidal particle and drying and/or sintering the stabilized spheroidal particle.

15 Claims, 4 Drawing Sheets

(56) References Cited

U.S. PATENT DOCUMENTS

| | | | |
|---|---|---|---|
| 6,725,930 | B2 | 4/2004 | Boney et al. |
| 7,806,181 | B2 | 10/2010 | Barmatov et al. |
| 7,849,923 | B2 | 12/2010 | Burukhin et al. |
| 7,931,966 | B2 | 4/2011 | Burukhin et al. |
| 8,230,925 | B2 * | 7/2012 | Willberg .................. C09K 8/68 166/280.1 |
| 8,562,900 | B2 | 10/2013 | Alary et al. |
| 8,657,002 | B2 | 2/2014 | Willberg et al. |
| 8,789,592 | B2 * | 7/2014 | Mason .................. C09K 8/604 166/265 |
| 8,883,693 | B2 | 11/2014 | Eldred et al. |
| 2006/0016598 | A1 | 1/2006 | Urbanek |
| 2006/0162929 | A1 | 7/2006 | Urbanek |
| 2008/0234146 | A1 | 9/2008 | Barmatov et al. |
| 2009/0178807 | A1 * | 7/2009 | Kaufman ................ C09K 8/80 166/276 |
| 2011/0180259 | A1 | 7/2011 | Willberg et al. |
| 2012/0227968 | A1 * | 9/2012 | Eldred .................. C09K 8/805 166/280.2 |
| 2012/0247764 | A1 | 10/2012 | Panga et al. |
| 2016/0017214 | A1 * | 1/2016 | Eldred ..................... C09K 8/80 166/280.2 |
| 2016/0152889 | A1 * | 6/2016 | Hopkins ............. C04B 33/1352 166/280.2 |
| 2018/0030337 | A1 * | 2/2018 | Pruett ..................... C09K 8/80 |

OTHER PUBLICATIONS

Liu et al., "A New Generation High-Drag Proppant: Prototype Development, Laboratory Testing, and Hydraulic Fracturing Modeling"; Society of Petroleum Engineers; SPE Hydraulic Fracturing Technology Conference, The Woodlands, Texas, USA, Feb. 3-5, 2015, [SPE-173338].

* cited by examiner

METHOD OF MAKING SPHEROIDAL PARTICLES

BACKGROUND

Hydrocarbons (such as oil, condensate, and gas) may be produced from wells that are drilled into formations containing them. For a variety of reasons, such as low permeability of the reservoirs or damage to the formation caused by drilling and completion of the well, or other reasons resulting in low conductivity of the hydrocarbons to the well, the flow of hydrocarbons into the well may be undesirably low. In this case, the well is "stimulated," for example, using hydraulic fracturing, chemical (such as an acid) stimulation, or a combination of the two (often referred to as acid fracturing or fracture acidizing).

Hydraulic and acid fracturing treatments may include two stages. A first stage comprises pumping a viscous fluid, called a pad, that is typically free of proppants, into the formation at a rate and pressure high enough to break down the formation to create fracture(s) therein. In a subsequent second stage, a proppant-laden slurry is pumped into the formation in order to transport proppant into the fracture(s) created in the first stage. In "acid" fracturing, the second stage fluid may contain an acid or other chemical, such as a chelating agent, that can assist in dissolving part of the rock, causing irregular etching of the fracture face and removal of some of the mineral matter, which results in the fracture not completely closing when the pumping is stopped. Occasionally, hydraulic fracturing may be done without a highly viscosified fluid (such as water) to minimize the damage caused by polymers or the cost of other viscosifiers. After finishing pumping, the fracture closes onto the proppant, which keeps the fracture open for the formation fluid (e.g., hydrocarbons) to flow to the wellbore of the well. The performance characteristics of the proppant contribute to the overall effectiveness of the fracturing stimulation.

Proppant is typically made of materials such as sand, glass beads, ceramic beads, or other materials. Sand is used frequently as the proppant for fracture treatments. Sand and ceramic proppant with close-to-spherical shapes are the most frequently used type of proppant in hydraulic fracturing. However, there has also been interest in employing non-spherical proppants. A mechanically connected proppant pack composed of non-spherical particles may exhibit a higher porosity compared to a pack of spheres. Furthermore, non-spherical particles may exhibit different settling properties compared to spherical particles, as well as reduce embedment due to a larger contact area from proppant to fracture face. Another perceived benefit of non-spherical proppants is the enhanced mechanical interactions with fibers for proppant transport (U.S. Pat. No. 8,230,925) in fracturing services in which the fracture treatment fluid contains fibers in addition to proppant. Also, the mechanically connected proppant pack composed of non-spherical particles may prevent flow back of the proppant.

Proppant morphology is a feature that is often exploited as a differentiator in proppant performance. Regular sand is typically not perfectly smooth and the degree of sphericity varies between grains. Some ceramic proppants have been developed to achieve high degrees of smoothness and sphericity. See, for example, U.S. Pat. No. 8,883,693. Patents directed to proppants of various compositions with irregular shapes or various sizes include U.S. Pat. No. 6,725,930 (metallic wire), U.S. Pat. No. 7,806,181 (polymer particles), U.S. Pat. Nos. 7,849,923 and 7,931,966, and U.S. Patent Application Publication No. 2011/0180259 (plates) and U.S. Patent Application Publication Nos. 2008/0234146 and 2012/0247764 (non-spherical mixed with spherical). Yinghui Liu et al. published an article on an X-shaped high-drag proppant to minimize settling. See Liu et al., "A New Generation High-Drag Proppant: Prototype Development, Laboratory Testing, and Hydraulic Fracturing Modeling," SPE-173338, Society of Petroleum Engineers, February, 2015.

The so-called drip-casting manufacturing technique has been adapted for the manufacture of spherical ceramic proppants. Drip-casting substitutes conventional ways of pelletizing (also called granulating) ceramic proppant such as using high intensity mixers and pan granulators. Vibration-induced dripping (or drip-casting) was first developed to produce nuclear fuel pellets. See U.S. Pat. No. 4,060,497. It has subsequently evolved into applications for metal and ceramic microspheres for grinding media, pharmaceuticals and food industry. An application of vibration-induced dripping to aluminum oxide spheres is described in U.S. Pat. No. 5,500,162. The production of the microspheres is achieved through vibration-provoked dripping of a chemical solution through a nozzle. The falling drops are surrounded by a reaction gas, which causes the droplet to gel prior to entering the reaction liquid (to further gel). Using a similar approach, U.S. Pat. No. 6,197,073 covers the production of aluminum oxide beads by flowing a sol or suspension of aluminum oxide through a vibrating nozzle plate to form droplets that are pre-solidified with gaseous ammonia before their drop into ammonia solution. U.S. Patent Application Publication No. 2006/0016598 describes the drip-casting to manufacture a high-strength, light-weight ceramic proppant. U.S. Pat. No. 8,883,693 describes the application of the drip-casting process to make ceramic proppant.

What is still desired are new non-spherical particles and novel methods of making such non-spherical particles.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Described herein is a method for forming spheroidal particles, the method including inducing flow of a slurry comprised of particles and a reactant through orifice(s), detaching an amount of the slurry from the slurry flow following exit from the orifice(s), the detached amount forming a slurry body, forming the slurry body into a spheroidal shape, contacting the spheroidally shaped slurry body with a coagulation solution to form a stabilized spheroidal particle and drying and/or sintering the stabilized spheroidal particle.

Also described is a fracture treatment fluid that includes a viscous fluid and the spheroidal particles described herein.

DETAILED DESCRIPTION

Figure 1:
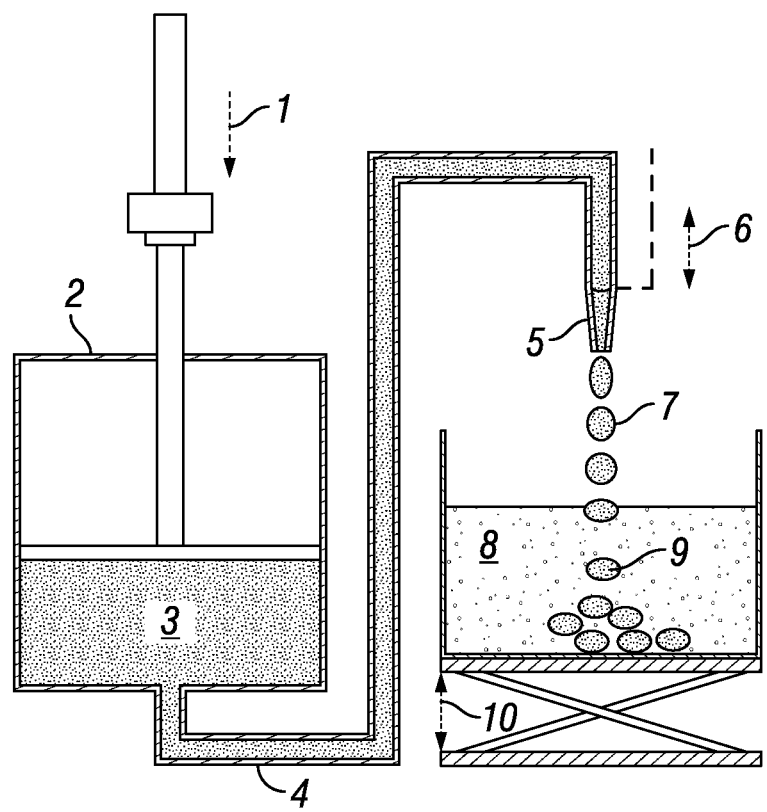
FIG. 1 is a schematic of an example apparatus for carrying out a method for making the spheroidal particles as described herein.

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation-specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. The term about should be understood as any amount or range within 10% of the recited amount or range (for example, a range from about 1 to about 10 encompasses a range from 0.9 to 11). Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, (1) even if numerous specific data points within the range are explicitly identified, (2) even if reference is made to a few specific data points within the range, or (3) even when no data points within the range are explicitly identified, it is to be understood (i) that the inventors appreciate and understand that any conceivable data point within the range is to be considered to have been specified, and (ii) that the inventors possessed knowledge of the entire range, each conceivable sub-range within the range, and each conceivable point within the range. Furthermore, the subject matter of this application illustratively disclosed herein suitably may be practiced in the absence of any element(s) that are not specifically disclosed herein.

The present disclosure relates to methods of making spheroidal particles, to the spheroidal particles made by the methods, and to fracture treatment fluids that contain the spheroidal particles made by the methods wherein the spheroidal particles may function as, for example, proppants and/or anti-flowback additives.

While in embodiments the spheroidal particles herein are used in the context of a treatment fluid, for example as a proppant material and/or anti-flowback additive, it is not intended that the spheroidal particles as described herein be limited to being proppants and/or anti-flowback additives in such treatment fluids.

As used herein, the term "treatment fluid" refers to any pumpable and/or flowable fluid used in a subterranean operation in conjunction with a desired function and/or for a desired purpose. In some embodiments, the pumpable and/or flowable treatment fluid may have any suitable viscosity, such as a viscosity of from about 1 cP to about 10,000 cP, such as from about 10 cP to about 1000 cP, or from about 10 cP to about 100 cP, at the treating temperature, which may range from a surface temperature to a bottom-hole static (reservoir) temperature, such as from about 0° C. to about 150° C., or from about 10° C. to about 120° C., or from about 25° C. to about 100° C., and a shear rate (for the definition of shear rate reference is made to, for example, Introduction to Rheology, Barnes, H.; Hutton, J. F; Walters, K. Elsevier, 1989, the disclosure of which is herein incorporated by reference in its entirety) in a range of from about $1\ s^{-1}$ to about $1000\ s^{-1}$, such as a shear rate in a range of from about $100\ s^{-1}$ to about $1000\ s^{-1}$, or a shear rate in a range of from about $50\ s^{-1}$ to about $500\ s^{-1}$ as measured by common methods, such as those described in textbooks on rheology, including, for example, Rheology: Principles, Measurements and Applications, Macosko, C. W., VCH Publishers, Inc. 1994, the disclosure of which is herein incorporated by reference in its entirety.

In embodiments, the method of making the spheroidal particles comprises inducing flow of a slurry comprised of starting particles and a reactant through one or more orifices, detaching an amount of the slurry from the slurry flow following exit from the one or more orifices, the detached amount forming a slurry body, forming the slurry body into a spheroidal shape, contacting the spheroidally shaped slurry body with a coagulation solution to form a stabilized spheroidal particle and drying and/or sintering the stabilized spheroidal particle.

As used herein, "spheroidal" refers to a shape that is like a sphere but not perfectly round, and thus is not spherical. The term is not intended to be limited to encompassing only perfect spheroids, but instead is intended to encompass any particles that are not perfectly spherical but are spheroid-like. Where rotated about its major axis, also referred to herein as the height direction of the spheroid, the result is a prolate (elongated) spheroid, like an American football or rugby ball. Where rotated about its minor axis, also referred to herein as a width direction of the spheroid, the result is an oblate (flattened) spheroid, like a lentil or M&M® candy. The height and width of the spheroidal particles herein may differ by a factor of at least 1.1. Thus, if the height of an oblate spheroid is 1 mm, the width should be at least 1.1 mm, and if the width of a prolate spheroid is 1 mm, the height should be at least 1.1 mm. The height to width ratio herein is also referred to as the aspect ratio of the spheroidal particles.

In embodiments, the method further comprises forming the slurry of starting particles and reactant by mixing. As the starting, raw material particles, the particles may be made of any suitable material, such as, for example, ceramic materials, sand, non-ceramic materials, composites of ceramic reinforced with additional stronger materials and the like. As the ceramic particles of the slurry, any suitable ceramic material may be used, for example glass and ceramic oxides such as alumina, bauxite, aluminum hydroxide, pseudo boehmite, kaolin, kaolinite, silica, silicates, clay, talc, magnesia and mullite. The ceramic particles may include alumina-containing particles or magnesium-containing particles. The ceramic particles may also be a composite particle that is comprised of ceramic reinforced with higher strength materials, which may be ceramic or non-ceramic, for example such as titanium carbide, carbon nanotubes or reinforcement elements such as fibers or polymers. Where the spheroidal particles may be used as a proppant that may need to withstand a higher fracture closure stress, for example of 6,000 psi or more, alumina-containing particles are suitable because spheroidal particles derived from alumina-containing particles have a higher strength and toughness. Typically, the higher the alumina ($Al_2O_3$) content, the higher the strength, hardness and toughness of the spheroidal particles. In embodiments, the ceramic particles may have an alumina content of from, for example, 5% to 95% by weight alumina, such as 20% to 75% by weight or 30% to 75% by weight.

While the starting particles may have any suitable size, an average size of less than 500 microns, such as an average size of 0.01 to 100 microns or 0.01 to 50 microns, may be desirable. The particles (i.e., the raw material for the spheroidal particles) are desirably sized depending on the orifice diameter through which the slurry will pass in forming the spheroidal particles, and the orifice diameter may be equal to or greater than, for example, ten times the raw material particle average diameter.

The reactant in the slurry may be any material that can be coagulated, gelled and/or cross-linked by another material that is present in the coagulation solution. Reactants are typically organic materials used to stabilize the shape of the slurry once it is formed into the desired spheroidal shape. The reactants thus react to form a stabilized solid or semi-solid shaped product once exposed to the coagulation solution. Examples of suitable reactants include, for example, polyvinyl alcohol, polyvinyl acetate, methylcellulose, dextrin, polysaccharides such as alginates, for example sodium alginate, and molasses. Sodium alginate is a naturally occurring polysaccharide that is soluble in water as the sodium salt, and is a suitable reactant in the methods described herein. The reactant may be included in the slurry in an amount of from 0.01% to 25%, such as 0.01% to 5% or 0.01% to 1% by weight of the slurry. The solids content of the slurry may be from, for example, 10% to 95%, such as 15% to 90% or 20% to 90%. The solids content may be adjusted so that the slurry has a suitable viscosity for flow through the one or more orifices, such as a viscosity of 1 to 10,000 cP measured at a shear rate of 100 (1/s).

The slurry may also contain one or more solvents. Possible solvents that can be used include water, alcohols, and ketones. Other additives may also be included in the slurry, such as lubricants and dispersants. Lubricants may include one or more of Manhattan fish oil, wax emulsions, ammonium stearates, and wax. Dispersants may include one or more of a colloid, polyelectrolyte, tetra sodium pyrophosphate, tetra potassium pyrophosphate, polyphosphate, ammonium citrate, ferric ammonium citrate, hexametaphosphate, sodium silicate, ammonium polyacrylate, sodium polymethacrylate, sodium citrate, sodium polysulfonate or hexametaphosphate salt, as well as any surfactant.

The slurry is housed in a container that is associated with the one or more orifices. The slurry is induced to flow from the container to the one or more orifices by any suitable method. For example, the slurry may be induced to flow from the container by applying a load to a piston in the container housing the slurry to force the slurry out an exit port of the container that is associated with the one or more orifices. Also, increasing pressure in the container housing the slurry by any suitable method, and/or decreasing a volume of the container housing the slurry by any suitable method, to force the slurry to exit the container at a port associated with the one or more orifices may also be used. The slurry may also be pumped from the container housing the slurry to the one or more orifices associated with an exit of the container.

The exit port of the container may be connected to a pipe through which the slurry flows to the one or more orifices. Alternatively, the exit port may directly feed the slurry to the one or more orifices.

The one or more orifices may be comprised of a single orifice for making spheroidal particles or may be comprised of multiple orifices that each makes spheroidal particles. Each orifice may be in the form of, for example, a nozzle or an opening in a membrane. Each orifice has a size that correlates with an end size desired for the spheroidal particles. The orifices thus may have a size of from, for example, 0.1 mm to 1 cm, depending on the approximate size desired for the end spheroidal particles.

The orifices are located above the coagulation solution. The apparatus may permit the height of the orifices from the coagulation solution to be adjusted, as the height that the slurry particles fall is a factor contributing to the final spheroidal shape of the particles.

The coagulation solution comprises a coagulant that interacts with the reactant in the slurry to coagulate, gel and/or cross-link the reactant, thereby forming the slurry into a stabilized solid or semi-solid product. Thus, when particle of the slurry comes into contact with the coagulation liquid, the coagulation liquid interacts with the reactant in the slurry particle to stabilize the shape of the slurry particle. The slurry described herein is rather flowable and malleable prior to stabilization. Some examples of useful coagulation solution coagulants include, for example for use with sodium alginate as a reactant, a calcium salt such as chloride solution at suitable concentration of calcium chloride, or an aluminum chloride hexahydrate solution. The amount of coagulant to include in the solution should desirably be sufficient at a minimum to coagulate, gel and/or cross-link the reactant and at a maximum should desirably not exceed the concentration that will dissolve into the solution. For example, a suitable concentration of the coagulant in the coagulation solution may be, for example, 0.1% to 25%, such as 0.1% to 10% by weight of the coagulation solution.

The slurry may be flowed through the orifices at any desirable rate. In embodiments, the slurry flow rate may be sufficiently slow that an amount of the slurry is able to separate from the slurry flow, after it has passed through an orifice, as a result of its own weight, similar to a drop of water separating from a water flow out of a tap. Depending on the viscosity of the slurry, a flow speed sufficient for this embodiment may be, for example, from 0.01 to 0.5 m/s for an alumina slurry having a solids content of 75% by weight and an orifice size of 0.37 mm in diameter. If higher flowing speeds are used, a sufficient height will be necessary to ensure that the slurry body detaches and attains the desired shape before entering the coagulation solution.

In other embodiments, physical means may be used to separate the slurry into separate particle sized slurry bodies after it has passed through an orifice. For example, vibration energy may be applied to the one or more orifices to separate a particle sized slurry body from the slurry flow. Application of the vibration may be controlled such that it is applied at regular intervals based on the flow rate of the slurry in order to sever the slurry flow at the desired points such that separate particle sized bodies are formed. In this embodiment, the vibration energy is at a combination of sufficient frequency and amplitude to separate the slurry bodies from the slurry flow. A range of frequencies in this embodiment may be from, for example, 10-1,000 Hz for an alumina slurry made up of 75% by weight of solids, an orifice size of 0.37 mm in diameter, a flowing speed of 1 m/s and a falling height 4 cm. The vibration amplitude may be adjusted accordingly to achieve a desired particle size and shape. The vibration action thus reduces the size of the slurry body. The vibration energy can be applied in any direction, for example perpendicular or parallel to the axis of the orifice.

As the separated slurry body falls from the orifice to the coagulation solution, the slurry body transforms into a shape. When the slurry body falls into the solution, the reactant is promptly coagulated, or cross-linked, by the coagulant, which forms a stiff shell and stabilizes the slurry body in the spheroidal shape. As will be discussed further below, the height that the slurry body travels between the orifice and the coagulation solution, also referred to herein as the falling height and is the distance from the orifice to the surface of the coagulation solution, is controlled, along with other properties such as slurry viscosity, slurry flow rate, and vibration energy applied, so that the slurry body is able to form a desired spheroidal shape. In an apparatus for conducting the methods of forming the spheroidally shaped particles, the height of the orifices from the surface of the coagulation solution is desirably adjustable.

The stabilized spheroidal particles are collected from the coagulation solution by any suitable methodology. The collected stabilized particles are then dried using any suitable drying processes. For example, the stabilized particles may be subjected to air drying, or to drying using electric or gas driers. The stabilized particles may also be subjected to sintering, either as the drying step or as a separate step following drying. Sintering may be conducted at a temperature of from, for example, about 800° C. to about 2,300° C., such as from about 1,200° C. to about 1,700° C.

FIG. 1 is a schematic of an apparatus that may be used for carrying out the above-described methods. In FIG. 1, the slurry (3) housed in container (2) is forced to flow by applying a load (1) on a piston. When the load is applied to the slurry, the slurry is made to flow out an exit port at the bottom of the container and into tube or pipe (4) that is connected with an orifice (5). The orifice is located above a coagulation solution (8). The slurry exits and is separated into individual slurry bodies (7), the separation being effected in this apparatus through use of a mechanical device (6) that applies a vibrational energy to the orifice. As the slurry bodies enter into the coagulation solution, the bodies are stabilized in the end spheroidal shape, resulting in stabilized spheroidal particles (9). The height between the orifice and the coagulation solution surface may be adjusted via height adjuster (10).

For spherical particles, the aspect ratio (the ratio of the height of the particle, or diameter in a vertical direction/major axis, to the width of the particle, or diameter in a horizontal direction/minor axis) is 1. The spheroidal particles herein have an aspect ratio that is not 1. For oblate spheroidal particles, the aspect ratio is less than 1, such as less than 0.9 or less than 0.8. For prolate spheroidal particles, the aspect ratio is more than 1, such as more than 1.1 or more than 1.2. The spheroidal particles are thus non-spherical.

The size and degree of the non-spherical morphology of the spheroidal particles are dependent on the falling height, the slurry density and its rheological properties, the surface tension and density of the coagulation solution, and the vibration parameters. These values should be appropriately adjusted such that the slurry bodies of a given slurry composition are able to attain the desired spheroidal shape during the falling from the orifice to the coagulation solution. While one of ordinary skill in the art should be able to select the appropriate parameter values based on the foregoing description, the following additional description is given for additional guidance.

The physics of attaining the spheroidal shape is believed to be complex, but may be reasonably hypothesized. After the slurry body is detached from the orifice, the shape may be transient, and may transition between oblate, spherical and prolate (depending on factors such as, for example, the falling height and the viscosity of the slurry). The contact with the coagulation solution can further modify the shape, especially toward the oblate-type due to the inelastic deformation upon contact. Prolate-type particles tend to be able to withstand the contact with the solution due to their inherent high viscosity. In addition, the vibration energy may modulate the final particle shape. Higher vibration energy typically delivers more oblate particles, i.e., it augments the effects of height and impact energy.

Figure 2:
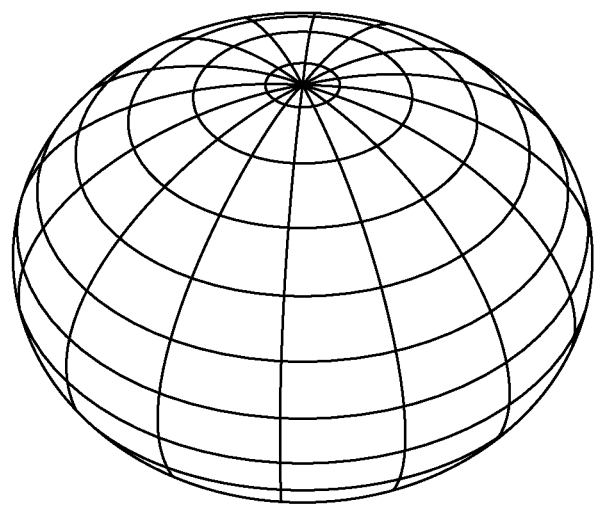
FIG. 2 is an example oblate spheroidal shape.

In embodiments, the slurry bodies may be controlled to have an oblate spheroidal shape, such as shown in FIG. 2, through appropriate control of the falling height and the slurry flow rate through the one or more orifices.

Figure 4:
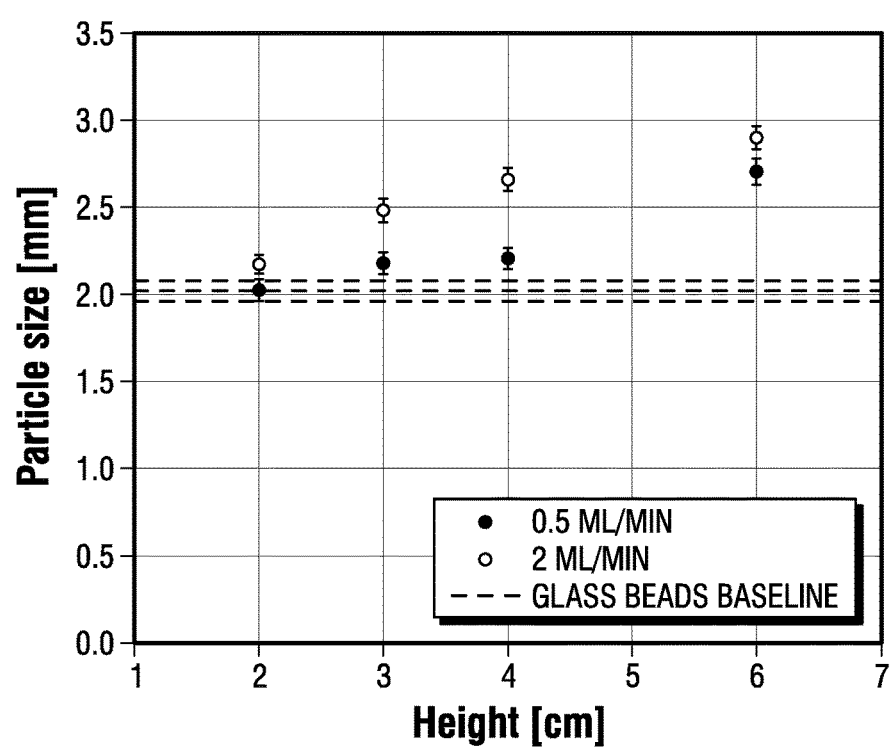
FIGS. 4 and 5 are graphs of particle size and morphology results of samples from different drop heights.
Figure 5:
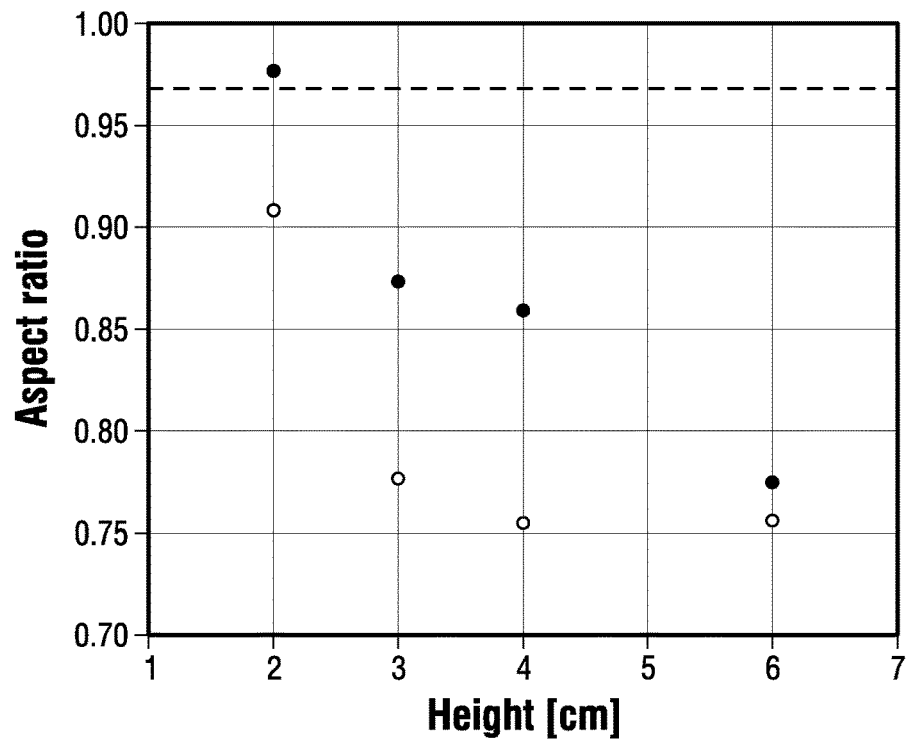

In this embodiment, a sample slurry of 144 g water, 400 g ceramic raw powder (alumina-based), 1.6 g of sodium alginate, 0.8 g of dispersant (synthetic polyelectrolyte dispersing agent), 0.38 g of phosphate based surfactant and 0.48 g of lubricant (alkali-free pressing agent) was prepared and used for illustration. The density of the slurry is 2.2 g/cc, and the viscosity of the slurry at 100 (1/s) is about 300 cP. Samples were created for experiments at 2, 3, 4 and 6 cm falling heights. Two flow rates were tested for the different falling heights. The flow rates corresponded to a dripping mode, that is, the flow rate is slow enough to allow for droplets to come lose from the orifice tip by gravity action. The orifice size is 0.37 mm in diameter. The particle size and morphology analyses were performed on a Camsizer (Retsch Technology), and the results are presented in FIGS. 4-5. The characteristic particle size reported in FIG. 4 corresponds to the measured maximum Feret diameter. The morphology parameter assessed by the Camsizer is aspect ratio (FIG. 5). The aspect ratio is computed as the ratio of the minimum chord and maximum Feret diameter estimated by the Camsizer optical methods. The particle size results for a sample of particles reported in FIG. 4 are conveyed as a data point and an error bar. The data point corresponds to the Dv50 value, and the top and bottom of the error bar correspond to the Dv90 and D10 values, respectively. The Dv-values correspond to standard percentile values obtained from the statistical analysis of the volume-based distribution. Dv50 is the particle size at which 50% (by volume) of the sample is smaller and 50% of the sample is larger. Similarly, Dv10 (Dv90) is the particle size below which 10% (90%) of the sample distribution lies. In general, the results indicate that more spherical particles were obtained at lower falling heights while oblate spheroidal particles were obtained at higher falling heights.

The results in FIGS. 4 and 5 show that for low flow rates (0.5 ml/min) and small heights (2 cm), the particles attain a narrow size distribution and a near spherical morphology (aspect ratio ~0.97). These Figures also show the results for glass beads of comparable size, which can be viewed as a baseline. The three lines reported in FIG. 4 related to the results for glass beads correspond to the Dv90, Dv50, and Dv10 values. The ceramic particles compared well to the morphology features of the glass beads. As the falling height is increased, the aspect ratio of the particle decreases, that is, the particles become more oblate (disk-like), with aspect ratios decreasing to below 0.90. These experiments show how the degree of oblate-morphology can be controlled accurately by the height adjustment. Furthermore, the resulting particles exhibit narrow size distributions. The percent differences between the Dv10 and Dv50 and between Dv50 and Dv90 values are less than 3.2% (percent differences calculated as the absolute values of the operations (Dv10-Dv50)/Dv50 and (Dv90-Dv50)/Dv50, respectively). Further, these experiments show that the flow rate can accentuate the trend from spherical to oblate. FIGS. 4 and 5 show the results for a flow rate of 2 ml/min. The aspect ratio decreases for particles created with drop heights of 3, 4 and 6 cm. The spheroidal (oblate) shape is the result of the impact of the slurry body onto the free surface of the solution. The end result of the impact of the slurry body and its accompanying deformation is an oblate spheroidal morphology, as quantified in FIG. 5. Similar results and observations are expected for embodiments employing mechanical vibration. For such cases, however, the particle sizes will be smaller than the counterparts developed via simple dripping given the higher flow rates associated with the application of mechanical vibration.

Figure 3:
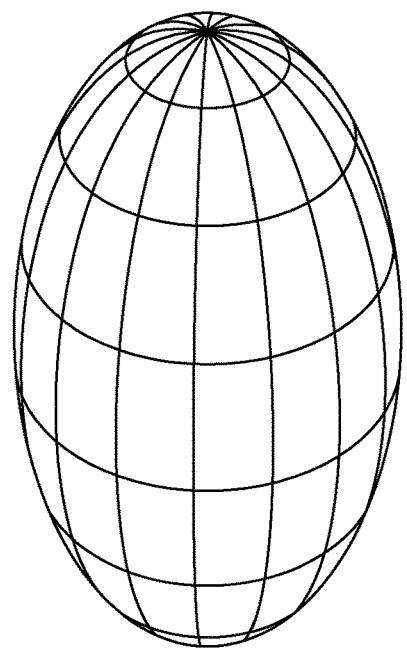
FIG. 3 is an example prolate spheroidal shape.

In embodiments, the slurry bodies may be controlled to have an oblate or prolate spheroidal shape, such as shown in FIG. 3, through appropriate control of the viscosity of the slurry.

Figure 6:
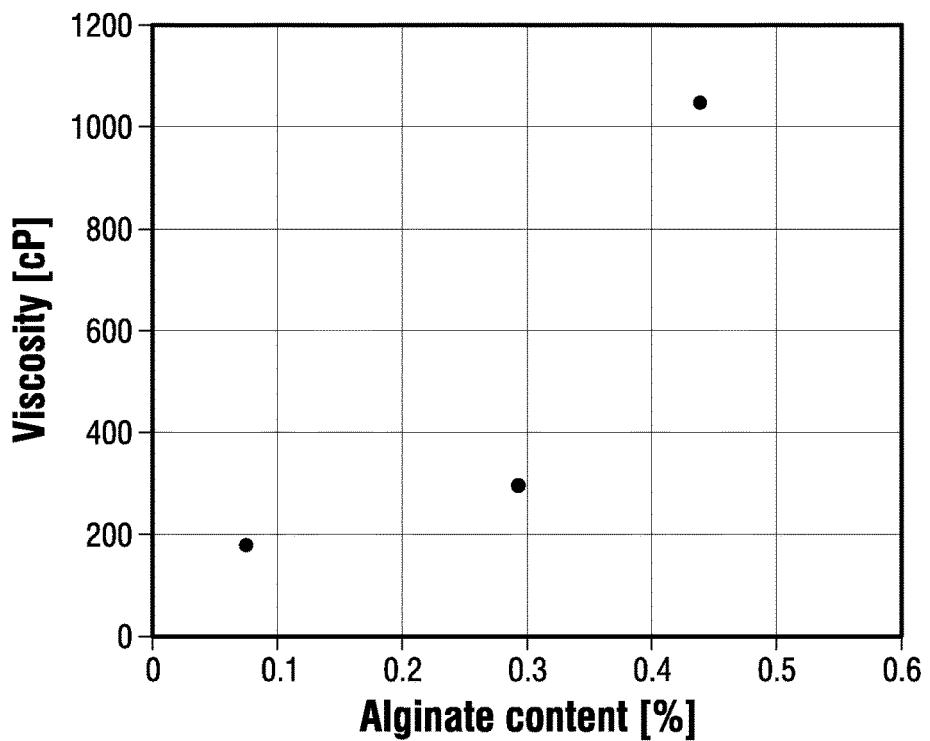
FIG. 6 is a graph of rheology assessments for slurries with different sodium alginate contents.

In this embodiment, a mechanism to reliably control the aspect ratio of the particles is the viscosity of the slurry through modifications of the reactant (in this particular case, sodium alginate) that enables the crosslinking for particle stabilization. Experiments were conducted for modifications of the sodium alginate content in the ceramic slurry recipe. For the experiments, the same basic slurry described above was used. FIG. 6 shows the rheology assessments for slurries with different sodium alginate contents. Larger amounts of sodium alginate reactant increase the slurry viscosity.

Experiments were conducted with the different slurries. The flow rate and falling height were set to 2 ml/min and 3 cm, respectively.

Figure 7:
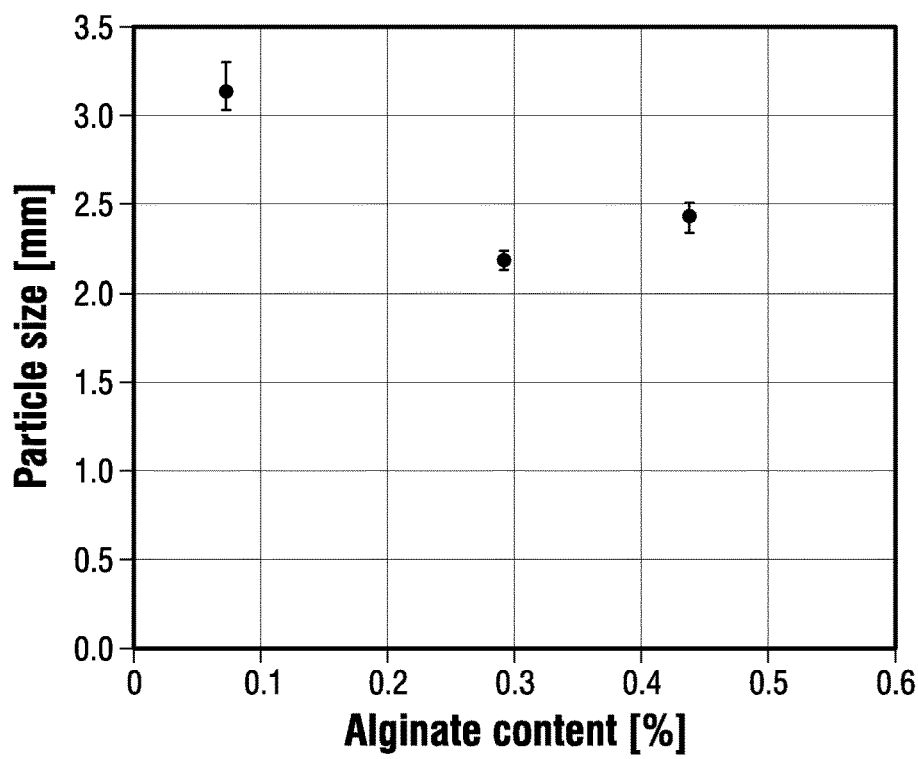
FIGS. 7 and 8 are graphs of particle size and morphology results of samples using different concentrations of alginate in the slurry.
Figure 8:
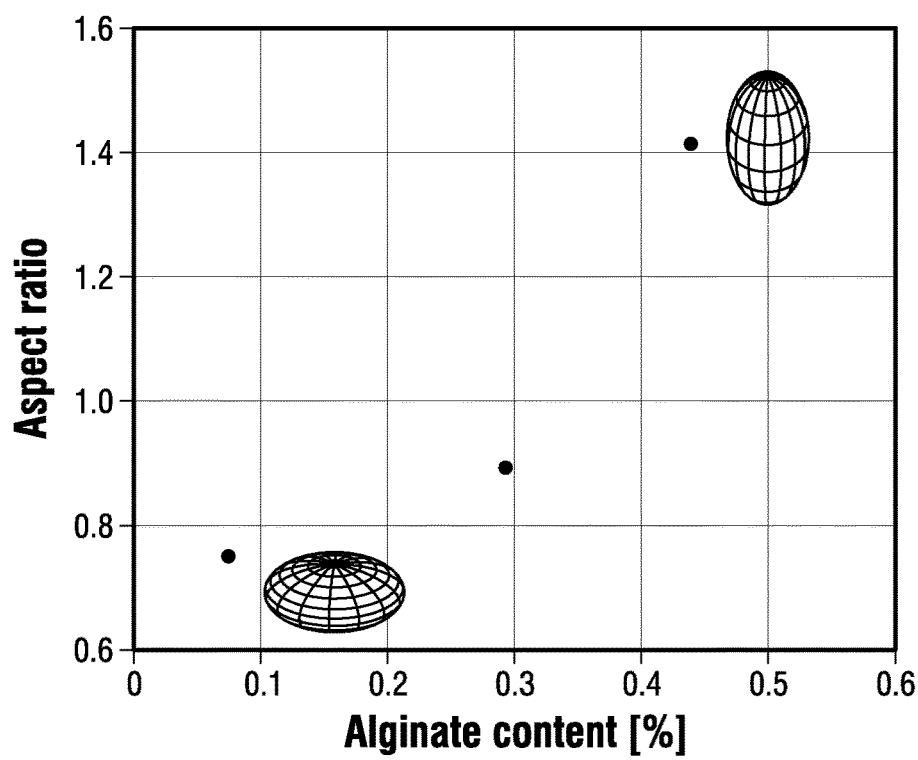

FIGS. 7 and 8 display the results of particle size and shape analyses as a function of alginate content. The sample with an alginate concentration of 0.29% by weight of slurry achieves particles with near spherical morphology. The particles created with a slurry made with an alginate concentration of 0.07% showed a larger characteristic size and an aspect ratio below 0.8 (oblate spheroid). The decrease in viscosity for the slurry (compared to the 0.29% by weight of slurry formulation) translates into more body deformation, which results in a propensity to deform during the impact with the coagulation solution. This deformation mechanism imparts specific symmetry to the particles, where the short axis is aligned with the direction of gravity (see aspect ratio sketch in FIG. 8).

In contrast, particles created using a slurry with 0.44% sodium alginate content displayed a prolate morphology (cigar-like shape). The prolate morphology is generated from the insufficient relaxation time between the slurry body breaking off from the orifice tip and hitting the coagulation solution. The slurry body undergoes deformation during the traveling time in the open air. The 0.29% by weight of slurry formulation particles with near spherical morphology have the opportunity to lock into the spherical shape during the travel time because the constitutive material (with 0.29% sodium alginate) is deformable and can attain the spherical shape in a characteristic time below the travel time. For the particles with 0.44% sodium alginate content, however, the time scale for the deformation of the discrete slurry body is larger, and therefore the elongated drop does not have the time to relax into a spherical shape. This deformation mechanism imparts the specific symmetry to the particles, where the long axis is aligned with the travel direction of the particle (also the gravity direction). See the aspect ratio sketch in FIG. 8.

The spheroidal particles produced by the methods described herein may have an average size (based on a largest diameter) of from 0.1 mm to 1 cm, for example from 0.1 mm to 5 mm or from 0.1 mm to 1 mm. The particles also have a narrow particle size distribution, for example a particle size distribution exhibiting differences between Dv10 and Dv90 values are less than 20%. For oblate spheroidal particles, the spheroidal particles may have an average aspect ratio of 0.91 or less, for example of 0.9 or less or 0.8 or less, or from 0.3 to 0.92, from 0.3 to 0.9 or 0.3 to 0.8. For prolate particles, the spheroidal particles may have an average aspect ratio of 1.1 or more, for example of 1.2 or more or 1.4 or more.

The spheroidal particles made by the methods described herein may exhibit a smooth surface, which along with the spheroidal shape of the particles may allow for random packing of the spheroidal (oblate and prolate) particles, which results in higher porosities and permeabilities compared to packings of spherical particles. Further, the narrow size distribution of the spheroidal particles (oblate or prolate) may allow for the maximum attainable permeability/porosity for the particle class size. Particle packings with broad size distributions exhibit lower permeability/porosity compared to packings with mono-sizes particles.

When used as a proppant, compared to conventional spherically shaped proppant, the spheroidal particles disclosed herein can interlock with fibers included in a fracture treatment fluid as a result of the symmetry of the spheroidal particles, achieving a lower settling rate, and thus may be more easily transported into fractures. Fracturing methodologies that use fibers in the fracturing fluid typically rely on proppant clusters/pillars to maintain the width of a fracture and channels for conducting the formation fluid. The interlocking of the spheroidal particles herein with the fibers may increase the strength of the pillars, compared to the use of spherical proppant with a similar surface texture.

The spheroidal particles described herein may be harder to flow back compared to spherically shaped proppant. The spheroidal particles may be used together with other shaped proppants as an anti-flowback additive. The spheroidal particles may also be used together with fiber to achieve enhanced anti-flowback control.

The spheroidal particles may also act as load-bearing elements for chemical diverters. Still further, the spheroidal particles may modify the settling properties of proppant as result of the shape, and reduce embedment due to larger contact area from proppant to fracture face.

In some embodiments, the concentration of the spheroidal particles in the treatment fluid may be any desired value, such as a concentration in the range of from about 0.01 to about 80% by weight of the treatment fluid, or a concentration in the range of from about 0.1 to about 25% by weight of the treatment fluid, or a concentration in the range of from about 1 to about 10% by weight of the treatment fluid.

Although the spheroidal particles may be used by themselves in the fluid, for example as proppants for a fracture, they may also be used together with conventional proppants, for example with spherical proppant particles of glass, sand, ceramic and the like. Other proppant particles may be used in a weight ratio of the spheroidal particles to the other proppant particles of from 0.1:1 to 10:1. In some embodiments, other proppants may include sand, synthetic inorganic proppants, coated proppants, uncoated proppants, resin coated proppants, and resin coated sand. The proppants may be natural or synthetic (including silicon dioxide, sand, nut hulls, walnut shells, bauxites, sintered bauxites, glass, natural materials, plastic beads, particulate metals, drill cuttings, ceramic materials, and any combination thereof), coated, or contain chemicals; more than one may be used sequentially or in mixtures of different sizes or different materials. The proppant may be resin coated. The spheroidal particles may also be resin coated, where desired.

In some embodiments, the treatment fluids may also include a fibrous material, as well known in the art. Fibers may be included in the treatment fluid in order to assist in transport of the proppants into the fractures. For example, the treatment fluid may comprise spheroidal particles and a fiber of any desired thickness (diameter), density and concentration that is effective to assist in the downhole operation. The fiber may be one or more member selected from natural fibers, synthetic organic fibers, glass fibers, ceramic fibers, carbon fibers, inorganic fibers, metal fibers, a coated form of any of the above fibers.

Fibers may be used in bundles. The fibers may have a length in the range of from about 1 mm to about 30 mm, such as in the range of from about 5 mm to about 20 mm. The fibers may have any suitable diameter or cross dimension (shortest dimension), such as a diameter of from about 5 to 500 microns, or a diameter of from about 20 to 100 microns, and/or a denier of from about 0.1 to about 20, or a denier of from about 0.15 to about 6.

The fibers may be formed from a degradable material or a non-degradable material. The fibers may be organic or inorganic. Non-degradable materials are those wherein the fiber remains substantially in its solid form within the well fluids. Examples of such materials include glass, ceramics, basalt, carbon and carbon-based compound, metals and metal alloys. Polymers and plastics that are non-degradable may also be used as non-degradable fibers. Such polymers and plastics that are non-degradable may include high density plastic materials that are acid and oil-resistant and exhibit a crystallinity of greater than 10%. Degradable fibers may include those materials that can be softened, dissolved, reacted or otherwise made to degrade within the well fluids. Such materials may be soluble in aqueous fluids or in hydrocarbon fluids.

Suitable fibers may also include any fibrous material, such as, for example, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof.

The treatment fluid includes a carrier solvent that may be a pure solvent or a mixture. Suitable solvents may be aqueous or organic based. For example, the treatment fluid may include a carrier solvent and the spheroidal particles. The fluid may be any suitable fluid, such as, for example, water, fresh water, produced water, seawater, or an aqueous solvent, such as brine, mixtures of water and water-soluble organic compounds and mixtures thereof. Other suitable examples of fluids include hydratable gels, such as guars, poly-saccharides, xanthan, hydroxy-ethyl-cellulose; cross-linked hydratable gels, viscosified acid, an emulsified acid (such as with an oil outer phase), an energized fluid (including, for example, an N2 or $CO_2$ based foam), and an oil-based fluid including a gelled, foamed, or otherwise viscosified oil. Suitable organic solvents that may act as a carrier solvent for the treatment fluids of the disclosure include, for example, alcohols, glycols, esters, ketones, nitrites, amides, amines, cyclic ethers, glycol ethers, acetone, acetonitrile, 1-butanol, 2-butanol, 2-butanone, t-butyl alcohol, cyclohexane, diethyl ether, diethylene glycol, diethylene glycol dimethyl ether, 1,2-dimethoxyethane (DME), dimethylether, dibutylether, dimethyl sulfoxide (DMSO), dioxane, ethanol, ethyl acetate, ethylene glycol, glycerin, heptanes, hexamethylphosphorous triamide (HMPT), hexane, methanol, methyl t-butyl ether (MTBE), N-methyl-2-pyrrolidinone (NMP), nitromethane, pentane, petroleum ether (ligroine), 1-propanol, 2-propanol, pyridine, tetrahydrofuran (THF), toluene, triethyl amine, o-xylene, m-xylene, p-xylene, ethylene glycol monobutyl ether, polyglycol ethers, pyrrolidones, N-(alkyl or cycloalkyl)-2-pyrrolidones, N-alkyl piperidones, N, N-dialkyl alkanolamides, N,N,N',N'-tetra alkyl ureas, dialkylsulfoxides, pyridines, hexaalkylphosphoric triamides, 1,3-dimethyl-2-imidazolidinone, nitroalkanes, nitro-compounds of aromatic hydrocarbons, sulfolanes, butyrolactones, alkylene carbonates, alkyl carbonates, N-(alkyl or cycloalkyl)-2-pyrrolidones, pyridine and alkylpyridines, diethylether, dimethoxyethane, methyl formate, ethyl formate, methyl propionate, acetonitrile, benzonitrile, dimethylformamide, N-methylpyrrolidone, ethylene carbonate, dimethyl carbonate, propylene carbonate, diethyl carbonate, ethylmethyl carbonate, dibutyl carbonate, lactones, nitromethane, nitrobenzene sulfones, tetrahydrofuran, dioxane, dioxolane, methyltetrahydrofuran, dimethylsulfone, tetramethylene sulfone, diesel oil, kerosene, paraffinic oil, crude oil, liquefied petroleum gas (LPG), mineral oil, biodiesel, vegetable oil, animal oil, aromatic petroleum cuts, terpenes, mixtures thereof.

Treatment fluids may optionally comprise other chemically different materials. In embodiments, the treatment fluid may further comprise stabilizing agents, surfactants, diverting agents, or other additives. Additionally, a treatment fluid may comprise a mixture of various crosslinking agents, and/or other additives, such as fibers or fillers. Furthermore, the treatment fluid may comprise buffers, pH control agents, and various other additives added to promote the stability or the functionality of the treatment fluid. The components of the treatment fluid may be selected such that they may or may not react with the subterranean formation that is to be treated.

In some embodiments, the treatment fluid may further have a viscosifying agent. The viscosifying agent may be any crosslinked polymers. The polymer viscosifier can be a metal-crosslinked polymer. Suitable polymers for making the metal-crosslinked polymer viscosifiers include, for example, polysaccharides such as substituted galactomannans, such as guar gums, high-molecular weight polysaccharides composed of mannose and galactose sugars, or guar derivatives such as hydroxypropyl guar (HPG), carboxymethylhydroxypropyl guar (CMHPG) and carboxymethyl guar (CMG), hydrophobically modified guars, guar-containing compounds, and synthetic polymers. Crosslinking agents based on boron, titanium, zirconium or aluminum complexes are typically used to increase the effective molecular weight of the polymer and make them better suited for use in high-temperature wells.

Other suitable classes of polymers that may be used as a viscosifying agent include polyvinyl polymers, polymethacrylamides, cellulose ethers, lignosulfonates, and ammonium, alkali metal, and alkaline earth salts thereof. Additional examples of other water soluble polymers that may be used as a viscosifying agent include acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyalkyleneoxides, other galactomannans, heteropolysaccharides obtained by the fermentation of starch-derived sugar and ammonium and alkali metal salts thereof.

In some embodiments, the carrier fluid may optionally further comprise additional additives, including, for example, acids, fluid loss control additives, gas, corrosion inhibitors, scale inhibitors, catalysts, clay control agents, biocides, friction reducers, combinations thereof and the like. For example, in some embodiments, it may be desired to foam the composition using a gas, such as air, nitrogen, or carbon dioxide.

The foregoing is further illustrated by reference to the following examples, which are presented for purposes of illustration and are not intended to limit the scope of the present disclosure.

Although the preceding description has been set forth with reference to particular means, materials and embodiments, it is not intended to be limited to the particulars disclosed herein; rather, it extends to all functionally equivalent structures, methods and uses, such as are within the scope of the appended claims. Furthermore, although only a few example embodiments have been described in detail above, those skilled in the art will readily appreciate that many modifications are possible in the example embodiments without materially departing from the disclosure herein. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method, comprising:
   inducing flow of a slurry of treatment fluid comprised of particles and a reactant through one or more orifices of a container that received the slurry;
   applying vibration to the one or more orifices to detach an amount of the slurry from the slurry flow exiting the one or more orifices, the detached amount forming a slurry body having a spheroidal shape;
   contacting the spheroidally shaped slurry body with a coagulation solution to form a stabilized oblate or prolate spheroidal particle in a solid or a semi-solid form, wherein a slurry viscosity is adjusted to form the oblate or prolate spheroidal particle; and
   drying and/or sintering the stabilized oblate spheroidal particle to form an anti-flowback additive.

2. The method according to claim 1, wherein the inducing flow of the slurry is performed by applying a load to a piston in a container housing the slurry to force the slurry through the one or more orifices associated with an exit of the container, increasing pressure in the container housing the slurry to force the slurry through the one or more orifices associated with an exit of the container, decreasing a volume of the container housing the slurry to force the slurry through the one or more orifices associated with an exit of the container, or pumping the slurry from the container housing the slurry to force the slurry through the one or more orifices associated with an exit of the container.

3. The method according to claim 1, wherein the method further comprises forming the slurry prior to inducing flow of the slurry by mixing the reactant and the particle.

4. The method according to claim 1, wherein the detaching comprises controlling a flow rate of the slurry to permit the detaching to occur as a result of a weight of the amount of the slurry exited from the one or more orifices.

5. The method according to claim 1, wherein the particle is an alumina-containing particle.

6. The method according to claim 1, wherein the reactant is an alginate and the coagulation solution comprises a calcium salt.

7. The method according to claim 1, wherein the one or more orifices comprise one or more nozzles or one or more openings of a membrane.

8. The method according to claim 1, wherein the oblate spheroidal particle has an average aspect ratio of 0.91 or less.

9. The method according to claim 8, wherein the oblate spheroidal particle has an average aspect ratio of 0.8 or less.

10. The method according to claim 1, wherein the prolate spheroidal particle has an average aspect ratio of 1.1 or more.

11. The method according to claim 10, wherein the prolate spheroidal particle has an average aspect ratio of 1.4 or more.

12. The method according to claim 1, wherein a shape of the oblate or prolate spheroidal particle is further controlled by a flow rate of the slurry through the one or more orifices and a distance between the one or more orifices and the coagulation solution.

13. The method according to claim 12, wherein a shape of the oblate or prolate spheroidal particle is further controlled by the vibration energy used to sever the slurry body.

14. A method, comprising:
   inducing flow of a slurry comprised of particles and a reactant through an orifice of a container that received the slurry;
   applying vibration to the orifice to detach an amount of the slurry from the slurry flow exiting the orifice, the detached amount forming a slurry body having a spheroidal shape;
   contacting the spheroidal shaped slurry body with the coagulation solution to form an oblate or prolate spheroidal particle, wherein a slurry viscosity is adjusted to form the oblate or prolate spheroidal particle;
   adding a plurality of the oblate or prolate spheroidal particles to a carrier solvent, thereby forming a treatment fluid; and
   using the plurality of the oblate or prolate spheroidal particles as an anti-flowback additive.

15. The method of claim 14, wherein the treatment fluid further comprises fibers.

* * * * *